(No Model.) 2 Sheets—Sheet 1.
C. FRANZEL.
CLEANER, SHELLER, AND PEELING MACHINE.
No. 466,402. Patented Jan. 5, 1892.
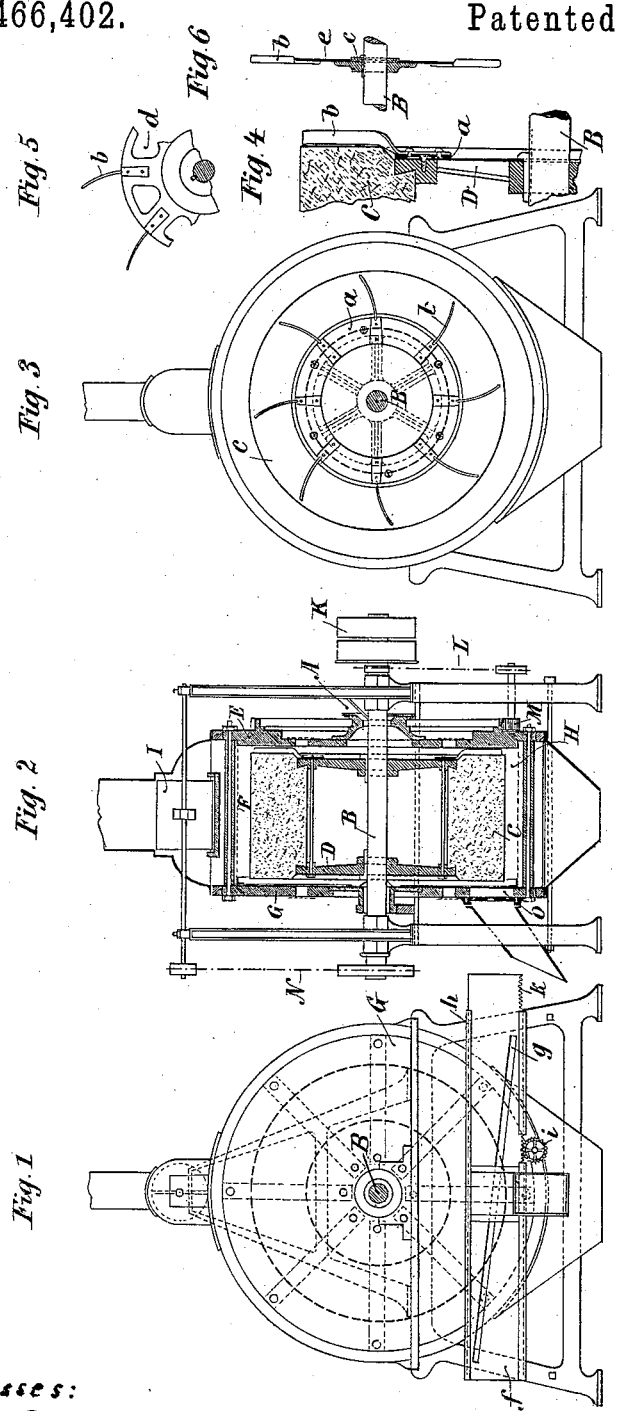
Witnesses:
J. S. Barker
Will E. Noff
Inventor:—
Carl Franzel
by Richards & Co.
attys.

(No Model.) 2 Sheets—Sheet 2.
C. FRANZEL.
CLEANER, SHELLER, AND PEELING MACHINE.
No. 466,402. Patented Jan. 5, 1892.
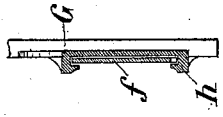
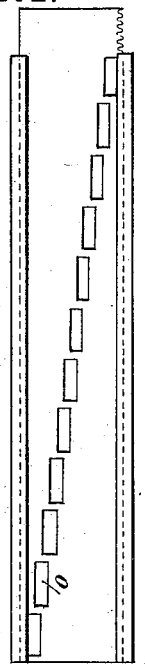
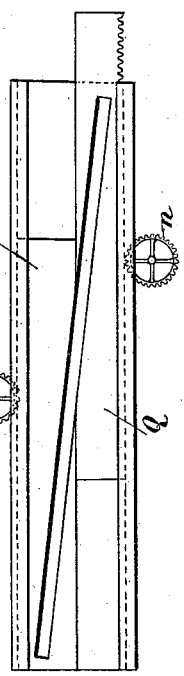
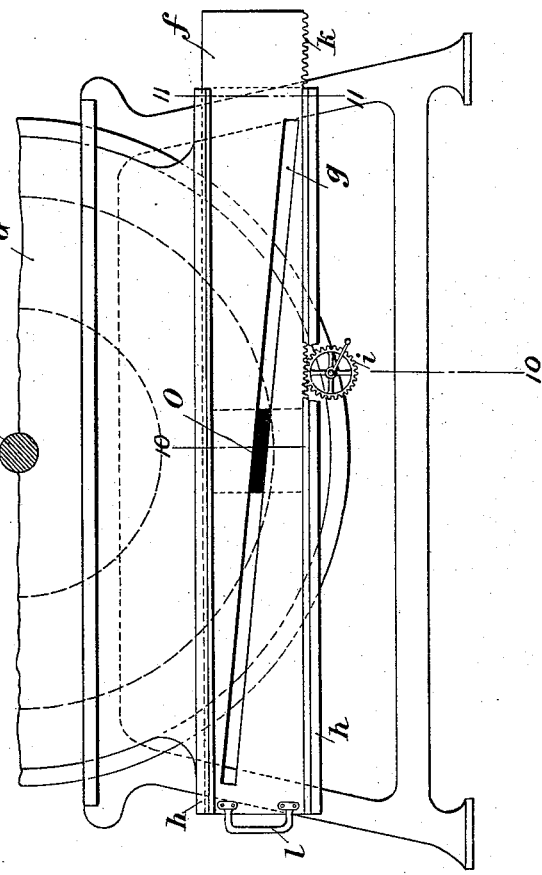
Witnesses:
J. S. Barker
Will E. Neff
Inventor:
Carl Franzel
by Richards & Co.
attys

UNITED STATES PATENT OFFICE.

CARL FRANZEL, OF DOMSTADTL, AUSTRIA-HUNGARY.

CLEANER, SHELLER, AND PEELING-MACHINE.

SPECIFICATION forming part of Letters Patent No. 466,402, dated January 5, 1892.

Application filed October 15, 1890. Serial No. 368,242. (No model.)

*To all whom it may concern:*

Be it known that I, CARL FRANZEL, mill owner, a subject of the Emperor of Austria-Hungary, and a resident of Domstadtl, Maehren, Austria-Hungary, have invented certain new and useful Improvements in Cleaners, Shellers, and Peeling-Machines, of which I declare the following to be a full, clear, and exact description.
My invention has reference to grain-cleaning machines, especially, however, to the grain-decorticating sheller and peeling-machine for which I have received United States Letters Patent No. 426,796, dated April 29, 1890, and is designed to facilitate the practical use of these machines and to increase their capacity, as I have found from practical experience that these machines, in their present arrangement, do not answer the requirements, partly on account of an insufficient air-supply and partly because the accumulation-regulator is difficult to manipulate.

The improvements I have made consist of a device for distributing the grain as it enters the machine and of an apparatus of simple construction to discharge the grain after treatment.

In the accompanying drawings, forming part of this specification, Figure 1 is a rear elevation of the machine with the slide in place. Fig. 2 is a central cross-section. Fig. 3 is a front view showing the dividing wings. Fig. 4 shows the means for fastening of the wings to the hub. Fig. 5 is a variation of the fastening of the dividing wings in face view. Fig. 6 is a vertical section of the parts shown in Fig. 5. Fig. 7 is a view of the arrangement of the slide at the discharge end of the machine on a larger scale. Figs. 8 and 9 show variations of the construction of the slide. Fig. 10 is a section on the line 10 10 of Fig. 7, and Fig. 11 is a section on the line 11 11 of Fig. 7.

A is the hopper.
B is the driving-shaft.
C is the stone scouring-cylinder.
F is the cylindrical casing.
D is an iron driver by means of which the stone cylinder is connected to the shaft, and H is the space between the cylinder and its casing, in which the cleaning, peeling, decorticating, and shelling is done.

The improvement is that to head D a ring *a* is secured, Fig. 4, which is provided with a number of slightly-curved wings *b*, designed to catch the grain as it is fed in through the hopper, and to distribute it equally to the space H between the friction-surfaces around the whole circumference of the cylinder and to force a strong current of air with and through the grain, and at the same time to crush any lumps of earth that may be contained in the grain.

The modification shown in Figs. 5 and 6 will only be used where it is not desirable to attach the wings to the cylinder-head. In this modification a flanged collar *c* is keyed on the driving-shaft B, and the plate *e*, with perforations, is secured thereon, to which the wings *b* are fixed.

By my improved construction the accumulation of large quantities of grain in the lower part of the machine is avoided, a blast is produced which greatly aids the quick moving of the grain in the interior of the machine, and thereby facilitates its working in a great measure, which could never be accomplished by only drawing the air through the machine by an air-exhaust arranged at the tail end. Finally, this arrangement also crushes any lumps of earth which may be mingled with the grain, and by changing them to dust they may be discharged rapidly through the openings in casing F by the blast produced by the wings or vanes.

The arrangement for the regulation of the discharge consists of a horizontally-arranged slide or gate *f*, which covers the outlet-opening O of the machine. This slide is provided with a diagonal slit or slot *g*, so that when a higher or a lower part of the same is brought to the outlet-opening of the machine the running out of the grain can be hastened or retarded by drawing the grain from a higher or lower level.

On the outer wall or cover G of the machine are secured the guides or way-pieces *h* for the slide *f*, which must be planed off carefully to allow the slide *a* to play easily. This slide can consist, as in Figs. 1, 7, 9, and 10, of one piece, in which case it is shifted endwise by means of a cog-wheel *i*, meshing with a rack cut in the lower edge of the slide. On smaller machines the cog-wheel may be omitted and the slide moved by means of handles *l* attached to its ends. To facilitate the handling of the slide, it can be made of two parts P and Q, as shown in Fig. 8. In this case there is a cog-wheel *m* for the upper part P, as well as one *n* for the lower part Q, of which the upper wheel *m* is attached to the stationary cover of the machine.

The two parts of the slide glide on one another and are only so long that when the slot in the upper part serves as an outlet the unopen lower part of the slide completely covers the outlet of the machine, and vice versa.

Instead of using one diagonal slot, several horizontal slots or openings *o* can be used, as in Fig. 9, which are arranged stepwise, and which are exactly as broad as the outlet of the machine. This slide, as also the single slide with diagonal slot or opening, can be made in a two-part slide. The result of this is not only a saving of material, but also an easier handling of the slides.

What I claim is—

1. In a grain-cleaning machine, the combination, with the cleaning devices and the casing in which they are mounted having a discharge-opening at its tail end, of the slide mounted in ways opposite the said discharge-opening, in which it is free to be moved transversely and provided with the discharge opening or openings arranged diagonally across the slide, substantially as set forth.

2. In a grain-cleaning machine, the combination, with the cleaning or scouring devices and the casing provided with a discharge-opening, of the slide *f*, provided with a diagonal slot *g*, the horizontal ways in which the slide is mounted, and the means for moving the slide horizontally in the ways, substantially as set forth.

3. In a grain scouring or cleaning machine, the combination, with the cleaning devices and a casing provided with a discharge-opening, of a regulating device for the discharge-opening consisting of two slides mounted opposite the said discharge-opening, each slide being provided with a diagonal slot, substantially as set forth.

In witness whereof I have hereunto set my hand in presence of two witnesses.

CARL FRANZEL.

Witnesses:
CHS. DABOVICH,
W. B. MURPHY.